Fig. 5.

INVENTORS
William H. Payne
Ralph E. Henry
BY
Popp and Sommer
ATTORNEYS

April 18, 1967 — W. H. PAYNE ET AL — 3,314,337
PISTON FOR AN EXPANSION ENGINE
Filed Jan. 31, 1964 — 7 Sheets-Sheet 3

INVENTORS
William H. Payne
Ralph E. Henry
BY
Popp and Sommer
ATTORNEYS

April 18, 1967  W. H. PAYNE ET AL  3,314,337
PISTON FOR AN EXPANSION ENGINE
Filed Jan. 31, 1964  7 Sheets-Sheet 5

INVENTORS
William H. Payne
Ralph E. Henry
BY Popp and Sommer
ATTORNEYS

Fig. 8.

INVENTORS
William H. Payne
Ralph E. Henry
BY Popp and Sommer
ATTORNEYS

United States Patent Office 3,314,337
Patented Apr. 18, 1967

3,314,337
PISTON FOR AN EXPANSION ENGINE
William H. Payne, Olean, N.Y., and Ralph E. Henry, Rixford, Pa., assignors to Dresser Industries, Inc., a corporation of Delaware
Filed Jan. 31, 1964, Ser. No. 341,565
6 Claims. (Cl. 92—157)

This application is a continuation-in-part of copending application Ser. No. 36,644, filed June 16, 1960, now Patent No. 3,150,565.

This invention relates to improvements in engines and more particularly to reciprocating expanders.

The features of the invention are particularly advantageously employed in expansion engines applied in the liquefaction of cryogenic gases such as air or nitrogen, although the engines may be used in other processing applications.

With an expansion engine used for gas liquefaction, for example, the gas at an elevated pressure is introduced into a cylinder closed at one end by a reciprocable piston and the gas is allowed to expand against the piston to move the same and develop power. The work done by the expanding gas reduces its pressure and temperature, as is desired, and following the power stroke of the piston the expanded gas is exhausted from the cylinder. The admission and exhausting of the gas is controlled by valves.

Considering the admission or intake valve, for example, it is desired to open this valve quickly when the piston is essentially at rest or at top dead center. The time this valve remains open determines the power developed. The longer the valve is left open, the greater the power, and the shorter it is left open, the less the power. It is most important to close the intake valve rapidly so as to reduce throttling. No work is performed if energy is dissipated in throttling the gas resulting in a loss of power.

If mechanical means are employed in an attempt to actuate the valves quickly the mechanical parts must be large to develop the forces required and since the parts are physically large and heavy, inertia forces resist their quick acceleration.

Accordingly, it is an important object of the present invention to provide intake and exhaust poppet valves for an expansion engine which are actuated quickly by other than mechanical means so that inertia forces which impede the quick movement of mechanical parts are obviated. This is achieved by hydraulically actuating the valves.

Another important object is to provide a variable exhaust valve cutoff so that the recompression pressure of the engine can be controlled to provide optimum recompression. In this connection it is desired to have a minimum differential pressure between the recompression pressure at the end of the exhaust stroke and intake pressure to reduce throttling, valve mechanism forces and stresses, shock on running gear components and also operating noise. By providing variable exhaust valve cutoff the engine is adapted for adjustment to changes in operating conditions such as varying pressure in the intake conduit.

Another important object is to provide a variable intake valve cutoff so that the power output of the engine can be controlled. The variable cutoff feature of the invention with respect to both intake and exhaust valves is that the hydraulic valve actuating means are easily and readily adjustable to provide variable control as desired.

Another object is to provide valve assemblies which not only have a fast valve action but also have low valve inertia and impact.

Another object is to provide a valve assembly in which the stem of the valve slides in a non-lubricated packing which is maintained in effective sealing condition.

Another object is to provide such an expansion engine in which the piston has a substantial portion of its stroke occurring within a cylinder head which is at a lower temperature than the cylinder on which the piston actually slides.

Another object is to provide such a piston which is internally heated to maintain operability of the sealing or piston rings.

Another object is to provide such an expansion engine which is trouble-free in operation and durable so as to avoid down time for repairs and to give lasting service.

Other objects and advantages of the present invention will be apparent from the following detailed description of a preferred embodiment shown in the accompanying drawings in which:

FIG. 3 is an enlarged vertical central longitudinal sectional view through the left one of the reciprocating expanders shown in FIG. 1, this view being taken on line 3—3 of FIG. 1.

The numeral 10 represents a crankcase having a central depressed portion 11 to provide a sump and laterally extending feet 12 on opposite sides of the depressed portion 11. These feet 12 are shown as resting on the suitable base or foundation 13 for the machine.

Within the crankcase 10 is a crankshaft 14 rotatable about a horizontal axis and journalled in axially spaced bearings 15 and 16 mounted in bearing housings 18 and 19, respectively, these housings being suitably supported on crankcase 10. Intermediate the bearings 15 and 16, the crankshaft 14 is shown as provided with a pair of crank arms 20, 20 connected adjacent their outer ends by a crank pin 21 to provide a crank throw to which the connecting rods are connected as hereinafter explained. The end of crankshaft 14 adjacent bearing 16 is extended axially outwardly as indicated at 22 to provide an overhung shaft portion to which the rotor (not shown) of a driven mechansm such as an electric generator may be connected.

Figures 1, 2:
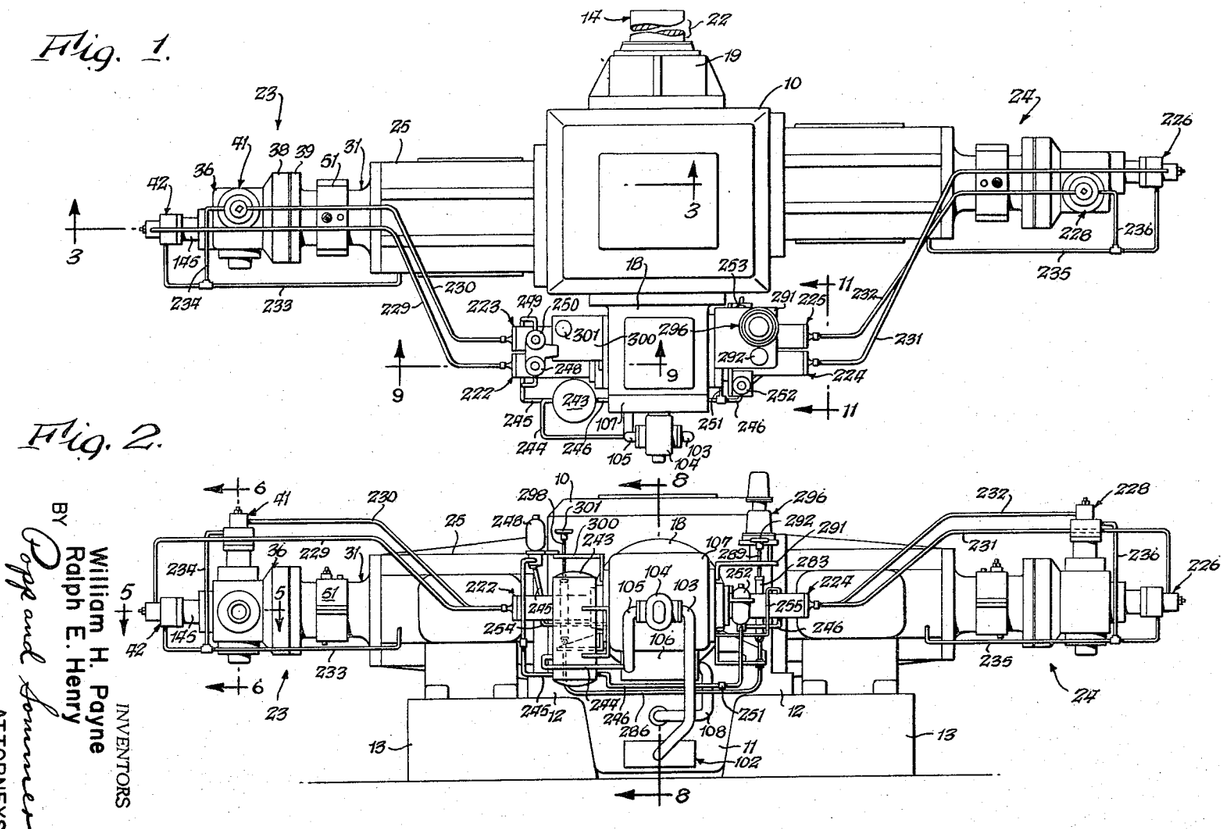
FIG. 1 is a top plan view of an expansion engine having a pair of reciprocating expanders, each of which is constructed in accordance with the principles of the present invention.
FIG. 2 is a front elevational view thereof.

Referring to FIGS. 1 and 2, a reciprocating expander indicated generally at 23 is arranged on the left side of crankcase 10 and a similar reciprocating expander 24 is illustrated on the right side of this crankcase. These expanders are axially offset with respect to the crankshaft 14 for a purpose which will become apparent hereinafter. Elements within these expanders are drivingly associated with crankshaft 14 as will be explained in detail hereinafter.

The reciprocating expanders 23 and 24 are similar in construction and hence only one will be described in detail, that being the left one 23. Suitably connected to the left side of crankcase 10 and projecting horizontally outwardly therefrom is an open ended bedsection 25 internally formed with vertically spaced upper and lower horizontal guide surfaces or ways 26, 26 engaged by the slides of a crosshead 28. Bedsection 25 rests on base 13 and is suitably connected to crankcase 10 as by screws 27 as shown in FIG. 3. The crosshead 28 is connected to crank pin 21 by a connecting rod 29. The connecting rod for the other expander 24 is designated 30.

Suitably connected to the outer end of the bedsection 25 is an open ended cylinder designated generally 31 arranged with its axis horizontal. This cylinder is shown as having an annular attaching flange 32 opposing the outer end of bedsection 25 and studs and nuts indicated at 33 secure this flange to the bedsection. A piston designated 34 generally is slidably arranged within the cylinder 31 and is connected to crosshead 28 by a strut rod 35 in a manner to be explained later herein. The outer end of cylinder 31 is closed by a cylinder head designated generally 36 and having an annular portion 38 opposing an annular attaching flange 39 provided on cylinder 31. Studs and nuts designated 40 secure flange 39 to annular portion 38.

Figure 6:
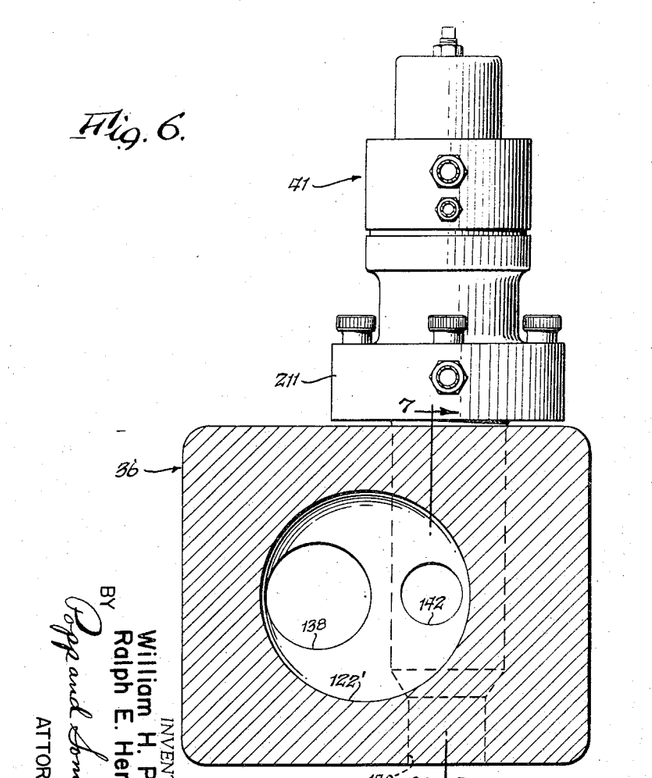
FIG. 6 is an enlarged vertical transverse sectional view of the cylinder head of the left expander, and taken on line 6—6 of FIG. 2.

An intake or admission valve assembly designated generally 41 is arranged on cylinder head 36, the central longitudinal axis of this valve assembly extending vertically transversely of the longitudinal horizontal axis of the cylinder and cylinder head on the rear side of such horizontal axis, as shown in FIG. 6. An exhaust valve assembly designated generally 42 is also shown mounted on the cylinder head 36 and the central longitudinal axis of this valve assembly extends horizontally and is forwardly eccentric to the longitudinal horizontal axis of the cylinder and cylinder head, as shown in FIG. 6.

Figure 4:
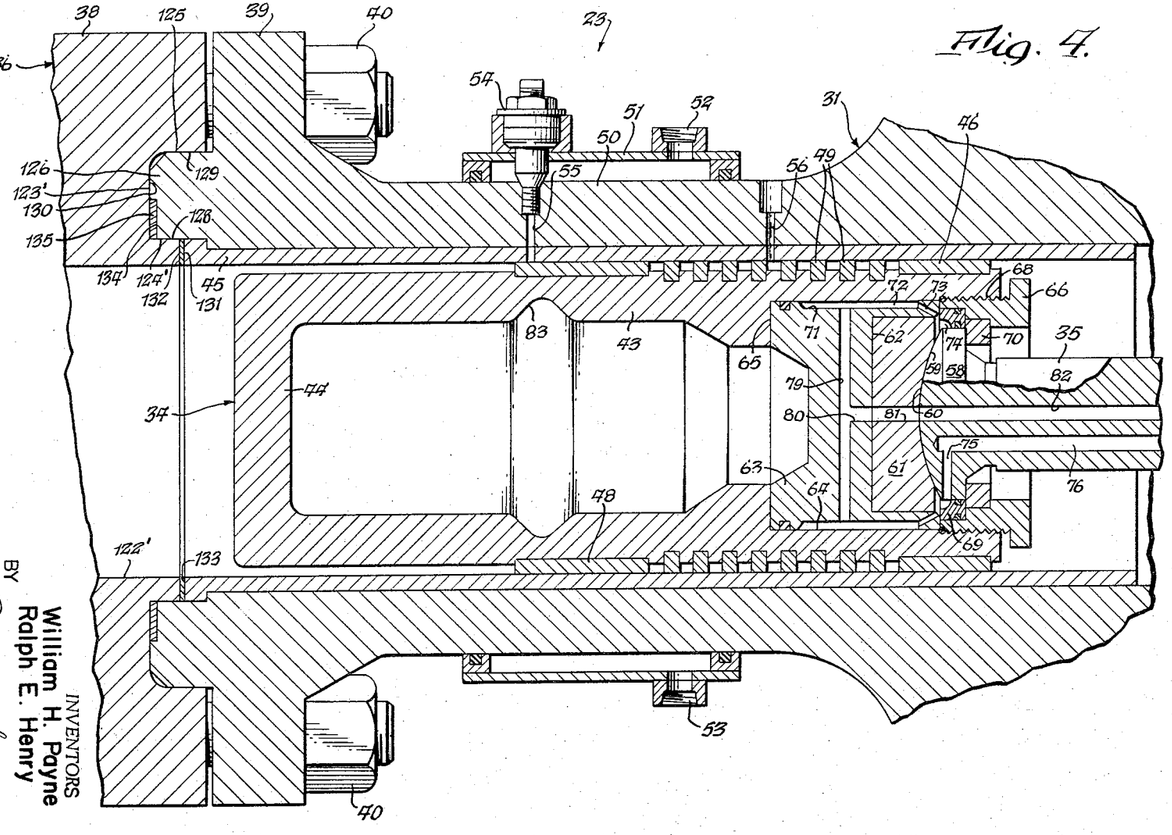
FIG. 4 is a still further enlarged central longitudinal sectional view of the piston and cylinder arrangement shown in FIG. 3.

The detailed construction of piston 34 will now be described. Referring to FIG. 4, this piston is shown as including an arcuate cup-shaped member having an annular wall 43 and an integral closed wall 44, the latter being disposed adjacent cylinder head 36. The periphery of the annular wall portion 43 is cylindrical and slightly spaced from the internal cylindrical surface of a cylinder liner 45 suitably arranged within cylinder 31. The annular wall portion 43 adjacent the end thereof remote from the end wall portion 44 is provided with an annular groove in which an annular wear band 46 is arranged. At a location generally centrally of the overall length of the piston 34, wall portion 43 thereof is provided with another annular groove in which another annular wear band 48 is arranged. Wear band 48 is shown as having a greater width measured in an axial direction than wear band 46. The cylindrical peripheries of the wear bands 46, 48 slidingly engage the internal surface of cylinder liner 45. Intermediate these wear bands 46, 48, the annular wall portion 43 of the piston is shown as provided with a plurality of uniformly spaced similar grooves in which piston sealing rings 49 are severally arranged. Eight such piston rings 49 are shown although any suitable number may be employed. These piston rings 49 are of the usual split type and spring biased outwardly so that their peripheries sealingly engage the internal surface of the liner 45. In this manner piston 34 is a floating piston which slides on the wear bands 46, 48 and blowby is prevented by the piston rings 49.

It will be appreciated that with the expansion of cryogenic gases in the engine, cylinder head 36 becomes quite cold. It is desired to heat cylinder 31 and the tail portion of the piston 34 so that the various relatively sliding surfaces are maintained adequately lubricated to minimize wear. In order to heat cylinder 31, the intermediate relatively thin wall portion 50 thereof is shown as surrounded by a jacket 51 through which a suitable heating medium such as hot water may be circulated. Cylinder jacket 51 is shown as having an inlet 52 and an outlet 53 for such heating fluid.

Means are shown for introducing lubricant to the internal surface of cylinder liner 45 adjacent cylinder jacket 51. For this purpose, a fitting 54 is shown as mounted radially on cylinder jacket 51 and at its inner end communicating with a conduit 55 which leads to the internal liner surface. Also shown is a conduit 56 leading to such surface from the exterior of the thin wall cylinder section 50, this conduit being arranged alongside cylinder jacket 51 on the side remote from cylinder head 36.

Means are provided for connecting piston 34 to the corresponding end of strut rod 35. For this purpose, such end of strut rod 35 is shown as having an enlarged cylindrical head 58 having a spherical outer convex end face 59 which engages a complementary spherical concave face 60 provided on one end of a cylindrical thrust block 61. This thrust block is shown arranged in the recess 62 of a cup-shaped carrier 63 in turn arranged within the counterbored recess 64 formed in the tail end of piston side wall 43 so as to leave an axially facing shoulder 65 which engages the inner end face of carrier 63. A gland nut 66 holds carrier 63 against shoulder 65 and this nut has a threaded engagement with the outer end of the piston side wall 43 as indicated at 68. Surrounding head 58 of strut rod 35 is a spacer ring 69. One end of this ring 69 abuts against the rim of thrust block carrier 63 and its other end bears against a shoulder on gland nut 66. A split retainer ring 70 at its inner end bears jointly against the opposing end faces of spacer ring 69 and the outer shoulder of stud rod head 58. The outer end face of this retainer ring 70 bears against an internal inwardly facing shoulder formed on gland nut 66.

The periphery of thrust block carrier 63 intermediate its ends is shown as provided with an annular groove 71 which opposes and is radially spaced from the side wall of the counterbored recess 64 thereby providing an annular chamber 72 therebetween. One end of this chamber communicates by a series of circumferentially spaced inclined passages 73 with an annular space 74 adjacent the edge of the spherical convex surface 59 and between the spaced apart and opposing end faces of the thrust block 61 and spacer ring 69. A radial passage 75 is provided in the strut rod head 58 and at its outer end communicates with the annular space 74 and at its inner end communicates with a fluid return passage 76 provided longitudinally in the stud rod 35. The opposite and remote end of this return passage 76 communicates with a radially disposed drain tube 78 which is carried by the stud rod 35 over the lower way 26 adjacent crosshead 28, as shown in FIG. 3.

Opposite portions of the annular chamber 72 are connected by diametral passage 79 provided in thrust block carrier 63 and which intercepts one end of a horizontal supply passage 80 formed in this carrier. The passage 80 in turn registers with a horizontal passage 81 provided through thrust block 61. The outer end of this passage 81 in turn communicates with one end of a passage 82 provided centrally and longitudinally through stud rod 35.

It will be seen that if a heating fluid such as heated lubricating oil is supplied through connected passages 82, 81, 80, 79 to the annular chamber 72, the annular wall portion 43 of the piston 34 will be heated adjacent the piston rings 49 and wear band 46. Such fluid flowing out of chamber 72 is conducted via the connected passages 73, 74, 75 and 76 to the drain conduit 78. In this manner the tail portion of the piston is heated.

An annular groove 83 is shown formed internally in the side wall portion 43 of the piston 34 adjacent the head end of wider wear band 48. This annular groove 83 reduces the thickness of the wall section and serves as a heat dam to restrict the flow of heat from the tail portion to the head portion of the piston.

The manner of supplying heated lubricating oil to passage 82 will now be described. Referring to FIG. 3, crosshead 28 is shown as provided on the side adjacent strut rod 35 with a recess to receive a thrust block 84 having a spherical concave surface which opposes and engages a spherical concave surface on an enlarged head 85 formed on the other end of the strut rod. These sperical surfaces are maintained in contact by a gland nut, spacer and retainer ring indicated collectively at 86 which are similar in detail to the corresponding elements described with respect to connection of the other end of strut rod 35 with piston 34. Thrust block 84 is provided with a horizontal through passage 88 which at one end registers with supply passage 82 in strut rod 35. This passage 88 also communicates with an alined passage 89 extending horizontally through crosshead 28 and terminating in communication with an arcuate groove or recess 90 formed in a sleeve bearing 91 carried by this crosshead. Oscillatably arranged in sleeve bearing 91 is a wrist pin 92 which is suitably connected to one end of connecting rod 29. Extending through wrist pin 92 and connecting rod 29 is a passage 93. One end of this passage at all times communicates with arcuate groove 90 in sleeve bearing 91. The other end of passage 93 communicates with one end of an axially diagonal passage 94 which is formed in crankshaft 14.

Figure 8:
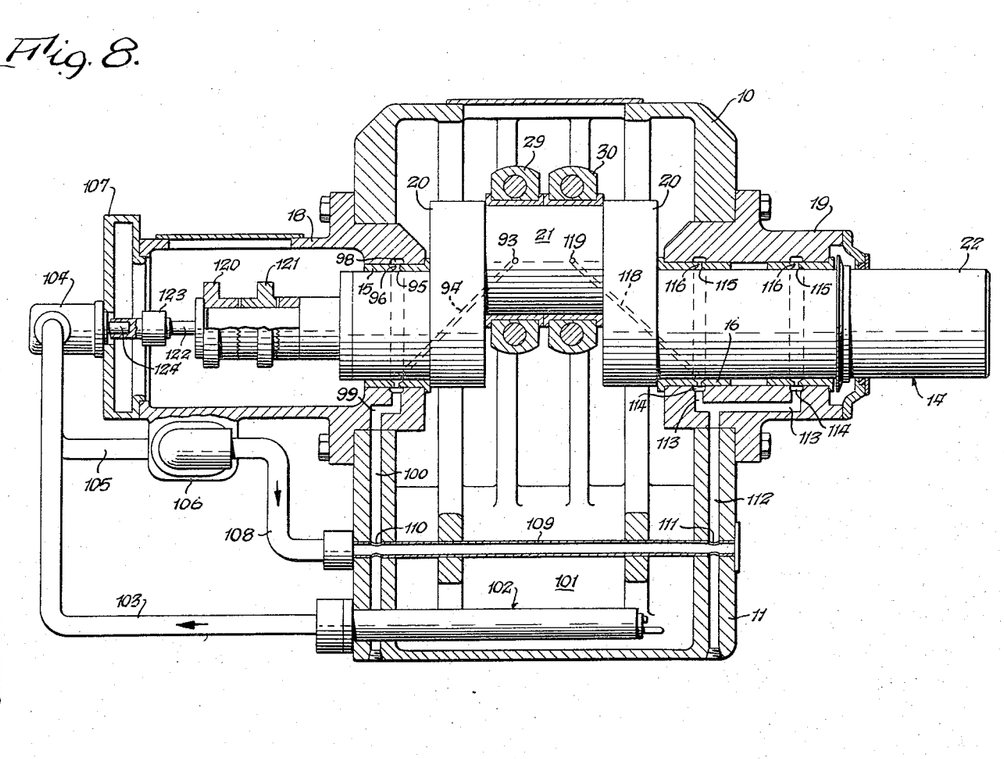
FIG. 8 is an enlarged vertical sectional view of the crankcase and showing the crankshaft and certain associated parts arranged therein, this view being taken generally on line 8—8 of FIG. 2.

As shown in FIG. 8, the other end of this passage 94 leads to the cylindrical surface of the trunnion portion of crankshaft 14 surrounded by bearing 15. This bearing has an internal annular groove 95 connected by a series of circumferentially spaced radial holes 96 to an internal annular groove 98 provided in bearing housing 18 surrounding bearing 15. Annular groove 98 communicates with a supply passage 99 suitably formed in bearing housing 18. In turn this passage 99 communicates with a vertical passage 100 provided in the front wall of crank case 10.

The depressed central portion 11 of crankcase 10 internally provides a sump 101 for lubricating oil which is withdrawn through a strainer and cooler assembly indicated at 102. A pipe 103 leads from assembly 102 to the inlet of an oil pump 104 shown mounted on a cover 107 closing the outer end of bearing housing 18. The outlet of this pump is connected to a discharge pipe 105 leading to the inlet of a filter assembly 106 the outlet of which is connected via a pipe 108 to a tube 109 which is arranged horizontally in crankcase 10 and extends between opposite front and rear walls thereof, as shown in FIG. 8. This tube 109 intercepts passage 100 and to provide communication therewith the tubing is shown as provided with a hole 110.

The other end of this tube 109 is shown as provided with a similar hole 111 which establishes communication between the interior of this tube and a vertical passage 112 provided in the rear wall of crankcase 10. The upper end of this passage 112 communicates with branch passages 113 formed in bearing housing 19 and which lead to axially spaced annular grooves 114 provided therein and surrounding bearing 16. Each of these grooves 114 is placed in communication with an internal annular groove 115 in bearing 16 via a plurality of circumferentially spaced radial holes 116 therein. Annular bearing groove 115 closer to crank arm 20 communicates with one end of an axially diagonal passage 118 provided in crankshaft 14. The other end of this passage 118 communicates with a longitudinal passage 119 provided in connecting rod 30 and corresponding to passage 93 in the other connecting rod 29.

Oil pump 104 is driven by a power take-off from the front end of crankshaft 14. Referring to FIG. 8, the front end of crankshaft 14 has two cams 120 and 121 mounted thereon for a purpose explained later herein. A coaxial shaft extension 122 is connected via a coupling 123 with the rotor shaft 124 of oil pump 104 which is preferably of a positive displacement type such as a gear pump.

It will be seen that operation of the expansion engine so as to rotate the crankshaft 14 will cause oil pump 104 to operate, drawing oil from sump 101 and feeding it to supply passages 100 and 112. From passage 100, oil is forced to flow through connected passages 99, 98, 96 and 95 to lubricate the bearing surface of bearing 15. As well, oil is forced to flow through connected passages 94, 93, 90, 89, 88 into supply passage 82 in strut rod 35. Since this lubricating oil becomes hot during operation of the expansion engine the heat thereof is utilized to warm the tail portion of piston 34 by circulating the heated fluid through annular heating chamber 72 as previously explained.

The inner end of cylinder 31 is shown closed by an end wall member 120' which houses a seal assembly surrounding and engaging the intermediate portion of strut rod 35. The cylinder space between end wall 120' and the tail end of piston 34 is connected to atmosphere via a lateral breather passage 121'.

Cylinder head 36 is in the form of a flat-sided block having at its inner end the annular portion 38. The cylinder head is provided with a cylindrical recess 122' which has the same diameter as the internal diameter of cylinder liner 45. Means are provided for maintaining cylinder head recess 122' and the bore of cylinder liner 45 in alined relation even under varying temperature conditions. For this purpose, the annular portion 38 of the cylinder head is shown in FIGS. 3 and 4 as provided with an annular groove 123' concentric with cylindrical recess 122'. This annular groove 123' has an inner cylindrical side wall surface 124' and an outer cylindrical side wall surface 125. An annular tongue 126 integrally formed on cylinder 31 and extending axially outwardly from the annular attaching flange portion 39 thereof, is shown as extending into groove 123'. This annular tongue is shown as having an inner cylindrical peripheral surface 128 and an outer cylindrical peripheral surface 129, these surfaces being concentric with the bore of cylinder liner 45. The outer end face 130 of annular tongue 126 is adapted to engage the bottom surface of groove 123'. When so engaging as shown in FIG. 4, the spacing between the opposing end surfaces 131 and 132 of cylinder liner 45 and cylinder head 36 is limited. In this space is provided an annular head gasket 133. Outer end face 130 of annular tongue 126 adjacent its inner edge is provided with a recess 134. In this recess an insulating ring 135 is arranged. This insulating ring 135 tends to minimize the transfer of heat between cylinder 31 and cylinder head 36. Gasket 133 is compressed between surfaces 131 and 132 and seals the joint between cylinder liner 45 and cylinder head 36. The extent to which head gasket 133 is compressed is limited by end face 130 of annular tongue 126 engaging the bottom face of annular groove 123'.

Opposing inner surfaces 124' and 128 have a close fit when the cylinder 31 and cylinder head 36 are both at substantially room temperature, whereas there is some clearance between opposing outer surfaces 125 and 129 at this temperature. Such contact of inner surfaces 124' and 128 provides a first marry. After the expansion engine is in operation for a time cylinder head 36 will acquire a much lower temperature than that of cylinder 31. This temperature differential causes a contraction of cylinder head inner surface 124' and an expansion of cylinder inner surface 128 so as to tend to separate these surfaces. At the same time cylinder head outer surface 125 contracts toward cylinder outer surface 129 which in turn expands outwardly toward cylinder head outer surface 125. The result is that outer surfaces 125 and 129 come in contact with each other and provide a second marry under this operating temperature differential condition to which the cylinder and cylinder head are subjected. It will be seen that whether the cylinder and cylinder head are at the same temperature or the cylinder head is at a lower temperature than the cylinder, the connection between the two is such that alinement of the cylinder head recess 122' with respect to the bore of cylinder liner 45 is maintained.

Figure 5:
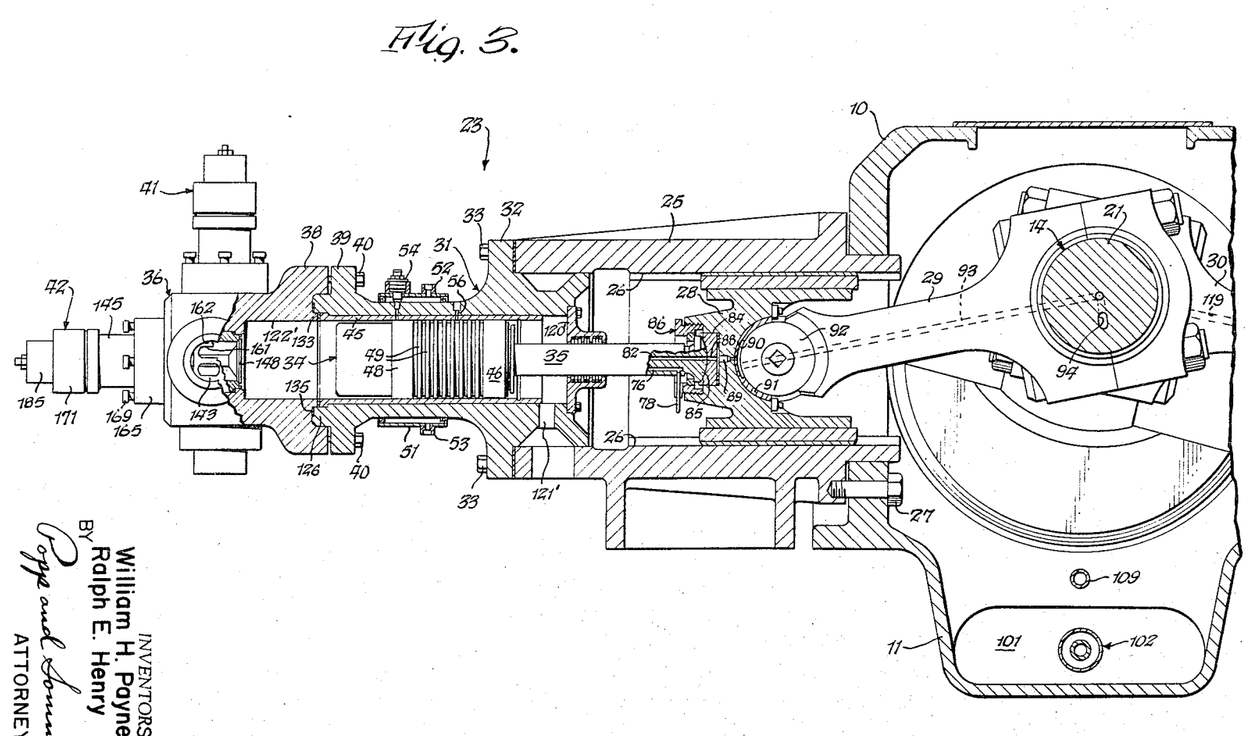
FIG. 5 is an enlarged central horizontal longitudinal sectional view of the exhaust valve assembly forming a component of the left expander and taken on line 5—5 of FIG. 2.
Figure 7:
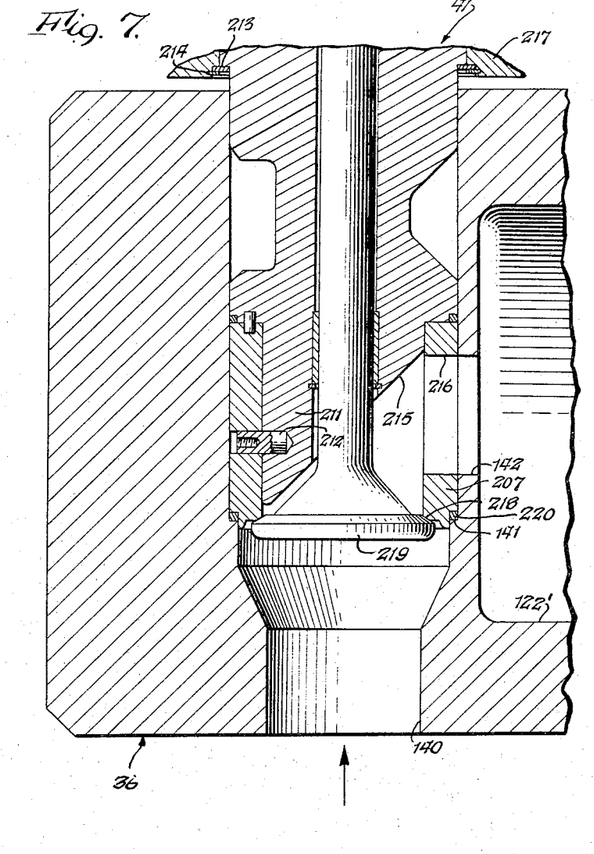
FIG. 7 is a still further enlarged fragmentary longitudinal sectional view of the intake valve assembly of the left expander, and taken on line 7—7 of FIG. 6.

Referring to FIGS. 5–7, cylinder head 36 is shown as provided with a horizontal through passage 138 which is counterbored to provide an outwardly facing shoulder 139 on which the exhaust valve assembly 42 is mounted as hereinafter explained. This passage 138 communicates with the inner end of cylinder head recess 122' and is eccentric with respect to the axis thereof as shown in FIG. 6.

Another but vertical passage 140 extends transversely through cylinder head 36 adjacent the inner end of cylinder head recess 122', as shown in FIG. 7. This vertical passage 140 is also counterbored to provide an upwardly facing annular shoulder 141 on which intake valve assembly 41 is mounted. Communication between vertical passage 140 and cylinder head recess 122' is provided by a hole 142 provided in the web of material separating this recess and passage. Hole 142 is an intake port for cylinder head recess 122' and is arranged to one side of the center of such recess as shown in FIG. 6. The lower end of vertical passage 140 may be suitably connected to a pipe (not shown) which serves as an intake conduit for the gas to be expanded in the engine.

Except for certain differences at the inner ends of the valve assemblies 41 and 42 later to be noted, these assemblies are otherwise similar in construction and hence a detailed description of only one will be given. The one to be described is exhaust valve assembly 42 shown in longitudinal section in FIG. 5.

Referring to FIG. 5, exhaust valve assembly 42 is shown as comprising interfitting inner, intermediate and outer body members 143, 144 and 145, respectively. Inner body member 143 at one end is formed to provide a seat 146 on which the head of a poppet valve 148 is adapted to seat. The member 143 is in the form of a sleeve mounted on the inner end of intermediate body member 144 and secured thereto as by a series of circumferentially spaced longitudinally disposed screws 149. The intermediate body member 144 is shown as having a throughbore 150 counterbored at its inner end to receive a bushing 151 and counterbored at its outer end to receive a non-lubricated stuffing box assembly indicated generally at 152. Poppet valve 148 has a stem 153 which slides on bushing 151 and extends through stuffing box assembly 152. Stuffing box assembly 152 may be of any suitable construction and is shown as comprising a plurality of packing devices, three such devices being shown and each including a packing cup 154 in the recess of which a pair of packing rings 155 are arranged with a garter spring embracing each ring. The stack of three such packing devices is closed by a retainer ring 156 against which a plurality of Belleville springs 158 are arranged, these springs being housed in the recess of a packing gland 159, in turn held in place by a packing gland nut 160. It will be seen that by tightening the nut 160, the Belleville springs 158 are flattened so as to compress the packing devices. The rings 155 of these packing devices are compressed by the garter springs into sealing engagement with the surface of valve stem 153. These packing rings 155 and the bushing 151 are preferably made of a self-lubricating material such as a long chain fluorinated polymer of ethylene.

Inner body member 143 is shown as formed with a hole 161 in its side wall which communicates with lateral horizontal exhaust passage 162 provided in cylinder head recess 122' is placed in communication with exhaust passage 162 via connected passages 138 and the interior of tubular inner body member 143. The outer end of horizontal passage 162 may be suitably connected to a pipe (not shown) which serves as an exhaust conduit for the gas which has been expanded in the engine.

To prevent excessive heat flow longitudinally of valve assembly 42, intermediate body member 144 is provided with an external groove 163 which provides a heat dam.

Outer body member 145 in part surrounds the outer portion of intermediate body member 144. The inner end face of outer body member 145 bears against a shoulder 164 formed on inner body member 143. Member 145 also has an integral annular attaching flange 165 which is provided with a series of circumferentially spaced counterbored through holes 166. A stud 168 extends through each such hole, the inner end of the stud being secured to cylinder head 36 and the outer end having threadedly mounted thereon a nut 169 which bears against the shoulder formed on the attaching flange 165 by reason of the counterbored hole 166. It will be seen that by tightening the nuts 169, the outer body member 145 is clamped against shoulder 164 of intermediate body member 144 which in turn forces inner body member 143 against shoulder 139 a suitable metallic gasket 170 being provided therebetween.

Intermediate and outer body members 144 and 145 respectively are shown fastened together by a lock pin 147 which is partly arranged in a radial hole extending through outer body member 145 including its flange portion 165, the inner end portion of this lock pin extending into a radial recess registering with said radial hole.

Means are provided for circulating a heating fluid such as hot water around the stuffing box assembly 152 so that seal rings 155 will remain flexible and conformable to valve stem 153 for effective sealing. While such means may be variously constructed the same is shown as including a pair of annular chambers 157, 157 surrounding packing cups 154 and formed by internal annular grooves in intermediate body member 144. Each such chamber 157 communicates via a plurality of circumferentially spaced radial holes 167 in intermediate body member 144 with an outer manifold chamber 177 formed by an internal annular groove in outer body member 145. This manifold chamber 177 has a suitably circumferentially spaced inlet and outlet 187 and 197, respectively, for attachment to supply and drain conduits (not shown).

Actuator means are provided for opening exhaust valve 148. As shown, such actuator means comprises an actuator cylinder member 171 which abuts the outer end face of outer body member 145 and is secured thereto as by a series of circumferentially spaced screws 172. The outer cylinder 171 is provided with a recess leading from the inner end face of the cylinder to provide a chamber 173 in which an actuator piston 174 is slidably arranged. One end of this piston 174 has a headed extension 175 which opposes a headed extension 176 on the end of valve stem 153. Arranged between the spaced apart and opposing end faces of these headed ends 175 and 176 are a pair of alining blocks 178 and 179, one of these blocks being provided with a spherical convex surface engaged by a complementary concave surface formed on the other block. One or more shims 180 may be provided between one of the alining blocks and one of the headed ends so as to take up any clearance between the inturned end portions of a split coupling ring 181 which overlap the shoulders on these headed ends. Surrounding the split ring 181 is an annular spring retainer 182. A helical compression spring 183 is shown as operatively arranged between the retainer 182 and a shoulder 184 formed on the outer body member 145.

The outer end wall 185 of the actuator cylinder 171 is provided with a stepped throughhole 186 having an outer internally threaded portion 188 of reduced diameter and at an inward location also formed to provide an inwardly facing annular shoulder 189. The hole 186 communicates with a later branch hole or inlet conduit 190 to which the passage of a fitting 191 mounted on the cylinder end wall 185 is connected. Fluid admitted through fitting 191 passes through connected passages 190, 186 and into chamber 173 where it drives actuator piston 174 rightward as viewed in FIG. 5A so as to open valve 148. Actuator piston 174 will move in such rightward direction until the trailing or left end of this piston uncovers a relief port 192 extending laterally from actuator chamber 173 and communicating therewith at a location spaced axially inwardly from the inlet end of chamber 173. Such axial spacing will determine at least grossly the extent of lift of the valve when unseated. This can be finally controlled by inserting the desired shims 193 between the opposing end faces of actuator cylinder member 171 and outer body member 145.

Suitable seal means are shown at 194 for preventing leakage of actuator fluid past actuator piston 174. While any suitable means 194 may be employed, that shown comprises a flexible tubular element having one end sealed to the actuator cylinder member 171 and its other end wipingly engaging the periphery of actuating piston 174. Leaking actuator fluid is drained through a drain port 195.

While fluid is utilized to open valve 148, the spring 183 is utilized to return the valve to a seated condition when this is permitted. In order to prevent the valve 148 from slamming against its seat 146, snubbing means are provided for controlling the terminal return movement of the actuator piston 174. Such snubbing means will now be described.

The snubbing means are shown as including a plug member 198 slidably arranged in hole 186 axially outwardly of the lateral inlet conduit 190. This plug member is formed integrally with an outer externally threaded stem portion 199 which is screwed into the threaded hole portion 188. Rotation of this stem 199 relative to end wall 185 shifts the axial position of plug member 198. A lock nut 200 arranged on the exposed portion of the threaded stem 188 and bearing against the outer end face of end wall 185 serves to hold this stem and the associated plug member 198 in the desired adjusted position. The inner end of plug member 198 is formed with an axially and inwardly extending tubular portion 201 the inner open end of which communicates with chamber 173 and at its outer end has a plurality of radial passages 202 therethrough to establish communication with lateral inlet conduit 190. The portion of hole 186 surrounding the tubular portion 201 is enlarged to provide an annular space 203 which communicates at opposite ends with chamber 173 and inlet conduit 190.

Check valve means are provided for permitting the flow of fluid through annular space 203 only toward cylinder chamber 173. Such means are shown as including an annular check valve 205 slidably arranged on the exterior of tubular portion 201 and movable away from and toward the annular shoulder 189 which forms a seat therefor. A preloaded helical compression spring 206 is shown as surrounding the tubular portion 201 and at one end bears against check valve 205 and at its other end bears against an integral enlarged head 208 formed on the inner end of the tubular portion 201. This tubular portion has a centrally located cylindrical bore 209 adapted to receive a throttling rod or plunger 210 carried by the actuator piston 174. The periphery of the throttling rod 210 has the desired clearance with respect to the wall surface of cylindrical bore 209 so that when the throttling rod enters or plunges into this bore the clearance between the opposing surfaces provides a restricted passage for the flow of hydraulic fluid from cylinder 171 into bore 209, such flow being effectively throttled and thereby snubbing the terminal return movement of the actuator piston.

Figures 5, 5A:
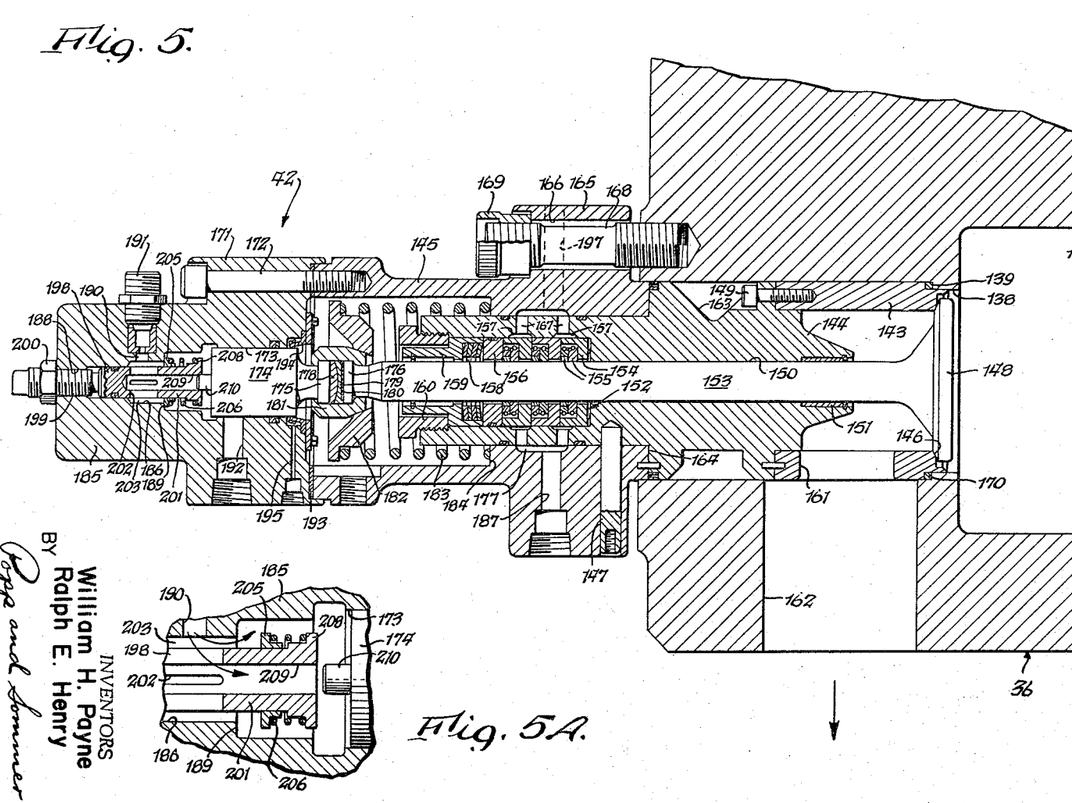
FIG. 5A is an enlarged fragmentary view similar to FIG. 5 and showing the actuator fluid check valve in an open condition, this valve forming part of a snubbing means.

On the other hand, when hydraulic fluid flows toward cylinder chamber 173, such fluid enters through branch inlet conduit 190 and flows into annular passage 203 as well as passing radially inwardly through radial passages 202 into bore 209, as illustrated in FIG. 5A. The pressure of the incoming fluid bears against check valve 205 and lifts it off its seat 189 against the urging of return spring 206. Thus a quick filling of actuator cylinder chamber 173 is effected resulting in a quick opening of exhaust valve 148.

At this time it is pointed out that intake valve assembly 41 has the same construction as detailed for the exhaust valve assembly 42 except for the differences illustrated in FIGS. 6 and 7. The inner, intermediate and outer body members are there shown at 207, 211 and 217, respectively. Members 207 and 211 are fastened together by a radial locking pin 212 arranged in a registered hole and recess in these members. Members 211 and 217 are fastened together by a retainer ring 213 and a split locking ring 214. The inner end face 215 of intermediate body member 211 is oblique and extends diagonally from a side opening 216 in inner body member 207 to an annular seat 218 for intake valve 219. Openings 216 and 142 communicate with each other. An annular metal gasket 220 is interposed between the shoulder 141 and opposing shoulder on inner body member 207.

The length of time intake valve 219 remains open determines the power or throughput of the expansion engine, whereas the length of time exhaust valve 148 remains open determines recompression pressure which is that pressure in the engine cylinder chamber when the intake valve 219 opens. Typically intake valve 219 opens about 5 degrees before top dead center and closes about 35 degrees after top dead center, and the exhaust valve 148 opens about 5 degrees before bottom dead center and closes about 30 degrees before top dead center. The opening of these valves is fixed as determined by cams 120 and 121 as later explained herein. On the other hand the closing of these valves is variable. Varying the cutoff of intake valve 219 varies capacity and output horsepower, a shorter cutoff or length of time the valve is open decreasing and a longer cutoff increasing. With respect to the exhaust valve 148, shortening its cutoff or length of time the valve is open increases recompression pressure, which is the pressure in the cylinder when the intake valve opens, whereas lengthening cut off decreases recompression pressure.

It is a feature of the present invention to vary exhaust valve cut-off so that recompression pressure can be controlled so as to be substantially equal to the intake pressure in conduit 140 upstream of intake valve 219. This is determined preferably by sound. For example, if the expansion engine pounds, recompression pressure is too low and exhaust valve cutoff should be shortened; if the engine clatters, recompression pressure is too high and exhaust valve cutoff should be lengthened. The engine runs quietly when exhaust valve cutoff is adjusted properly.

Figures 9, 10, 11:
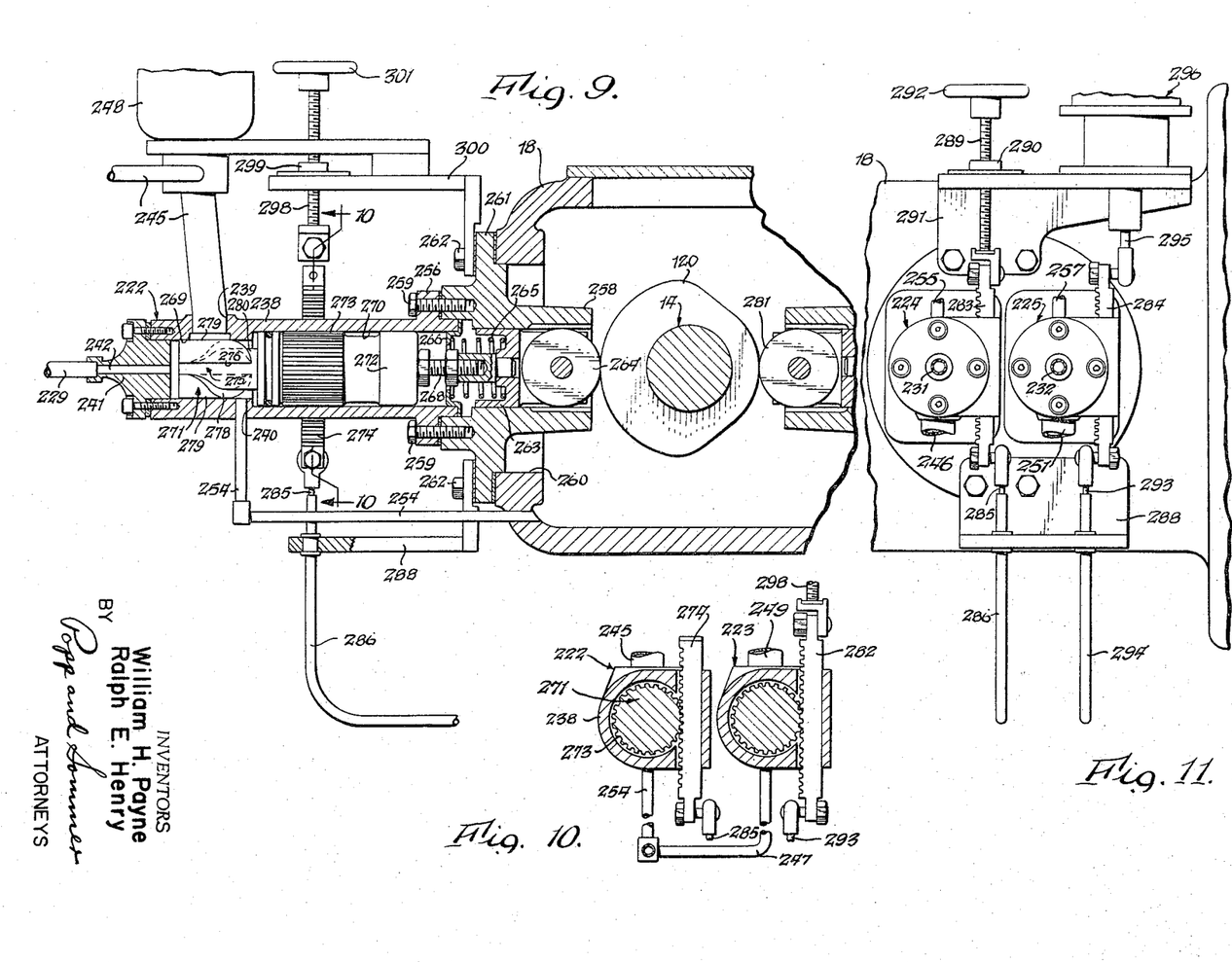
FIG. 9 is an enlarged vertical sectional view of one of the variable control pumps for controlling actuation of an engine valve, this view being taken generally on line 9—9 of FIG. 1.
FIG. 10 is a fragmentary transverse sectional view thereof taken on line 10—10 of FIG. 9.
FIG. 11 is a vertical end elevational view of the variable control pumps associated with the right hand reciprocating expander shown in FIG. 1, this view being taken generally along line 11—11 of FIG. 1.

Similar variable cutoff control means are provided for the exhaust and intake valves of each expander 23 and 24. In view thereof, only a detailed description of one will be described, being that associated with exhaust valve assembly 42. Referring to FIGS. 1, 2 and 9, the numeral 222 represents a hydraulic pump associated operatively with exhaust valve assembly 42. A similar hydraulic pump 223 is associated operatively with intake valve assembly 41. These pumps 222 and 223 are arranged side by side on the engine adjacent expander 23. A similar pair of pumps 224 and 225 are arranged side by side on the opposite side of the engine and are operatively associated with the exhaust and intake valve assemblies 226 and 228 respectively, of expander 24. The exhaust valve pumps 222 and 224 oppose each other and are arranged forwardly of the intake valve pumps 223 and 225 which also oppose each other. Outer cam 120 controls pumps 222, 224 and inner cam 121 controls pumps 223, 225.

Output pipe 229 connects pump 222 to fitting 191 of exhaust valve assembly 42; output pipe 230 connects pump 223 to the equivalent inlet port of intake valve assembly 41; output pipe 231 connects pump 224 to exhaust valve assembly 226; and output pipe 232 connects pump 225 to intake valve assembly 228.

Relief port 192 of exhaust valve assembly 42 is connected via a pipe 233 to the interior of bedsection 25 which drains into crankcase sump 101. A branch pipe 234 connects the corresponding relief port of intake valve assembly 41 to drain pipe 233. Similar main and branch drain pipes 235 and 236, respectively, are operatively associated with the valve assemblies 226 and 228 of the other expander 24.

Each of the pumps 222-225 includes a cylinder having axially spaced and diametrically opposed inlet and dump ports closed at its outer end by a removable end head having an outlet port. For exemplary pump 222 shown in FIG. 9, the cylinder is designated 238, the inlet port 239, the dump port 240, the end head 241 with an outlet port 242. Output pipe 229 is connected to outlet port 242. Output pipes 230-232 are similarly connected to the corresponding outlet ports of respective pumps 223-225.

The various pump inlet ports 239 are supplied with pressurized hydraulic fluid such as lubricating oil in the following manner. Referring to FIGS. 1 and 2, the numeral 243 represents an oil filter having an inlet port connected via pipe 244 to oil pump discharge pipe 105, and also having a pair of outlets one connected to pipe 245 and the other to pipe 246. The other end of pipe 245 is connected to pump inlet port 239 and has an accumulator bottle 248 inserted in such pipe. A branch pipe 249 extends from pipe 245 to the inlet port for pump 223 and has an accumulator bottle 250 inserted therein. The other filter outlet pipe 246 leads to the inlet port of pump 224 and has a branch pipe 251 which leads to the inlet port of pump 225. Accumulator bottles 252 and 253 are operatively inserted in pipes 246 and 251, respectively. Pumps 224, 225 are shown as being inverted as compared to pumps 222, 223. The filter 243 and accumulator bottles 248, 250, 252, 253 are supported on suitable brackets mounted on bearing housing 18.

Thus, when the oil pump 104 is operating oil maintained under pressure by the accumulator bottles is constantly available at the various pump inlet ports such as port 239 for pump 222 shown in FIG. 9.

Oil dumped by dump port 240 of pump 222 is carried away by a drain pipe 254 which connects with the interior of bearing housing 18 as shown in FIG. 9. A branch pipe 247 shown in FIG. 10 connects the corresponding dump port of pump 223 with drain pipe 254. A similar main drain pipe 255 is associated with the dump port of pump 224 and this pipe has a branch 257 shown in FIG. 11 connected to the dump port of pump 225.

As exemplary of all the pumps 222-225, the internal construction of pump 222 will now be described. The inner end of pump cylinder 238 has an external annular attaching flange 256 which opposes one end of a tubular housing 258 and is attached thereto by circumferentially spaced screws 259. This housing 258 is arranged in a suitable opening 260 in the side of bearing housing 18 and has an annular attaching flange 261 to permit its attachment to housing 18 by circumferentially spaced screws 262.

Slidably arranged on upper and lower ways in tubular housing 258 is a cam follower slide 263 one end of which is bifurcated to mount therebetween a roller 264 for rotation about an axis parallel to that of cam 120. This roller 264 rollingly engages the profile face of this cam. Roller 264 is constantly urged in engagement with cam 120 by a helical spring 265 one end of which bears against the slide 263 and the other end bears against an end wall 266 arranged on the inner end of cylinder 238. The inner end of slide 263 carries an axially adjustable thrust pin 268 which extends through a hole in end wall 266.

Pump cylinder 238 is shown as having a stepped cylindrical bore including an outer portion 269 with which ports 239 and 240 communicate and an inner portion 270 of larger diameter. Slidably arranged in the cylinder is a plunger represented generally by the numeral 271. This plunger 271 included an inner enlarged head portion 272 which sealingly slides on the wall of inner bore portion 270 and the intermediate portion of head 272 is formed as a ring gear 273 having longitudinally extending external teeth or splines. One side of cylinder 238 is open to expose teeth of ring gear 273 for engagement with a gear rack 274 suitably guided for vertical movement on the cylinder, as shown in FIG. 10.

The outer end portion of plunger 271 is provided with two similar and diametrically opposed grooves 275 each of which has one longitudinally extending straight radial edge 276 which is opposed by a helical radial edge 278 thereby to provide a pair of similar land surfaces 279, 279. Each helical edge 278 begins at an inner point spaced from but adjacent the end of plunger head portion 272 and spirals continuously through approximately 180 degrees and terminates in a substantially straight axially extending and circumferentially facing outer portion. This outer portion is opposed to and circumferentially spaced from straight edge 276 which extends axially to the generation point of the spiral edge for the other land. Thus, the grooves 275 lead from the outer end face of plunger 271 to an annular recessed portion 280.

The cam follower roller for pump 224 is shown in FIG. 9 at 281. This roller 281, like the roller 264, engages the peripheral surface of cam 120. Since these rollers 264 and 281 are opposed at a 180° interval, they control their respective plungers alternately.

Considering pump 222, when plunger member 271 thereof is retracted so as to uncover inlet port 239, the outer portion 269 of cylinder 238 is filled with hydraulic fluid admitted through inlet pipe 245. Subsequent movement of the plunger to the left as viewed in FIG. 9 caused by rotation of cam 120 will first recover inlet port 239 so as to trap a body of fluid in this chamber and force the same therefrom through outlet port 242. This pressurizing and displacement of hydraulic fluid continues until some portion of the lower helical edge 278 becomes positioned opposite dump port 240. When this occurs drain line 254 is placed in communication with the space between the outer end of plunger 271 and cylinder end wall 241 via the intercommunicating annular recess 280 and groove 275, thereby venting the pressurized hydraulic fluid to the sump. Pressure within output pipe 229 thereupon collapses.

As seen previously, when hydraulic fluid under pressure is introduced by this line 229 into inlet port 190 of the exhaust valve assembly 42, the actuator piston 174 is moved to the right as viewed in FIG. 5 thereby causing unseating of exhaust valve 148. Such displacement of piston 174 continues until the outer end of this piston uncovers relief port 192. After this occurs, excess fluid introduced into actuator chamber 173 via port 190 and communicating passages is exhausted via relief port 192, the piston 174 being so hydraulically held displaced against the urging of return spring 183. The control pump 222 delivers a volume of hydraulic fluid to actuator cylinder chamber 173 in excess of that necessary to displace actuator piston 174. When the pressure in output pipe 229 collapses, the spring 183 returns actuator piston 174 with the terminal snubbing action previously described and this closes exhaust valve 148.

It will be seen that by changing the annular position of plunger 271, a helical edge 278 will be presented to dump port 240 at different axial strokes of the plunger. In this manner, the length of time the actuator piston 174 is held hydraulically displaced can be varied and hence cutoff of the exhaust valve 148 is variably controlled.

Plunger 271 is rotated by gear rack 274 which has teeth which engage those on the plunger gear 273, as shown in FIG. 10. Rack 274 extends transversely of the axis of plunger 271 and is suitably guided on the pump body for reciprocable vertical movement in such transverse direction. The gear teeth 273 on plunger 271 have a sufficient axial length to remain engaged with the teeth of control rack 274 while this plunger is stroked by cam 120.

Control rack 274 may be actuated manually or automatically and the adjustment of this rack, it will be seen, controls cutoff or closing of the exhaust valve 148.

It will be understood that each of the control pumps 222–225 is provided with a control rack similar to rack 274 for pump 222. Thus, pump 223 has a control rack 282 as shown in FIG. 10, and pumps 224 and 225 have control racks 283 and 284, respectively, as shown in FIG. 11.

Control racks 274 and 283 for the exhaust valve control pumps 222 and 224, respectively, are tied together so that they move in unison. Similarly racks 282 and 284 for intake valve control pumps 223 and 225, respectively, are operatively tied together. For this purpose, the lower ends of control racks 274 and 283 are joined by a flexible cable 285 housed within a protective tube 286 which is U-shaped and suitably supported adjacent opposite ends on brackets 288 mounted on bearing housing 18. The extremities of control cable 285 are suitably connected to the lower ends of racks 274 and 283. It is to be noted that since control pump 224 is inverted with respect to control pump 222, when rack 283 moves upwardly, rack 274 moves downwardly in order to achieve the same movement relative to their respective plungers.

An adjusting rod 289 is suitably connected to the upper end of control rack 283. This rod 289 is externally threaded and screwed through an internally threaded sleeve 290 non-rotatably supported on a bracket 291 suitably mounted on the adjacent side of bearing housing 18. The upper of this rod 289 carries a handwheel or knob 292 to facilitate turning the rod.

It will be seen that by manually rotating handwheel 292, rod 289 moves axially relative to fixed sleeve 290 so as to shift the rack assembly comprised of the two racks 283, 274 and the interconnected control cable 285, either upwardly or downwardly depending upon the direction of rotation of the hand wheel. In this manner the cutoff of the exhaust valves can be regulated. Instead of manually controlling the adjustment, this may be done by automatic means (not shown).

In a similar manner the lower ends of control racks 282 and 284 for the intake valve control pumps 223 and 225, respectively, are suitably connected to opposite end of a U-shaped control cable 293 which is slidably housed in a protective tubing 294 also suitably mounted on brackets 288 alongside the other protective tube 286. The upper end of control rack 284 for pump 225 is shown as connected to the lower end of the piston rod 295 of a suitable air motor indicated generally at 296. This air motor is suitably supported on bracket 291.

Above the other intake valve control rack 282 is an adjustable rod 298 which is similar to rod 289. Thus rod 298 screws through an internally threaded sleeve 299 secured to a bracket 300 suitably mounted on bearing housing 18. The upper end of adjustable rod 298 carries a handwheel 301. The lower end of rod 298 is normally disconnected from the upper end of control rack 282 inasmuch as movement of this rack is under normal control of air motor 296. However, if manual control of the rack assembly comprised of intake valve control racks 282, 284 and interconnected control cable 293 is desired, the lower end of rod 298 is connected to the upper end of rack 282, as illustrated in FIG. 10. Suitable control means (not shown) for controlling the operation of air motor 296 are provided. Of course, instead of an air motor the automatic control means may comprise an electric or hydraulic motor.

*Operation*

Assuming the crankshaft 14 to be rotating, when the piston 34 of left expander 23 is substantially at top dead center, the intake valve 219 is unseated to allow gas under pressure to flow through inlet conduit 140, past the open intake valve, through holes 216 and 142 into the interior of cylinder 31. Opening of intake valve 219 is initiated by cam 121. At this time, exhaust valve 148 is closed or seated.

Intake valve 219 is opened by hydraulic fluid under pressure introduced through pipe 230 to the actuator of intake valve assembly 41 so as to drive its actuator piston downwardly as viewed in FIGS. 2 and 7. This pressurized hydraulic fluid is derived from variable control pump 223 which in turn derives its hydraulic fluid from oil pump 104. The variable control pump 223 delivers a charge of pressurized hydraulic fluid into the intake valve actuator chamber in excess of that required to fully open intake valve 219. This intake valve will have a predetermined lift and will stay open for a time depending upon the setting of rack 282 which determines the stroke of the variable control pump plunger. When the dump port of pump 223 is uncovered, the pressure of hydraulic fluid in pipe 230 drops or collapses whereupon the return spring of the intake valve assembly 41 returns the intake valve 219 quickly to its seat 218 but with a final snubbing action.

The charge of gas so taken into cylinder 31 expands to drive piston 34 toward bottom. At the appropriate time and in a manner similar to that described hereinabove, cam 120 causes the desired operation of variable control pump 222 which is associated with the actuator means of the exhaust valve assembly 42. When the exhaust valve 148 is moved off its seat 146, the expanded gas within cylinder 31 flows through hole 138, past the unseated exhaust valve, passes through hole 161 and into exhaust conduit 162.

Suitable conduits or pipes (not shown) supply and remove gas with respect to conduits 140 and 162.

The cutoff of exhaust valve 148 is so regulated by adjustment of rack 274 that the recompression pressure in cylinder 61 when intake valve 219 is subsequently opened is substantially equal to the pressure of gas in intake conduit 140. This tends to eliminate the effect of clearance volume. Adjustment of the rack 274 is made by turning threaded rod 298 in the appropriate direction to make the engine run smoothly.

Throughput capacity of the expansion engine is controlled by the air motor 296 or, if desired, by the manual override control 301, 298 after threaded rod is connected to rack 282.

One side of the machine operates 180° out of phase from the other side.

During operation, hot water is circulated through cylinder jacket 51 of both cylinders and lubricant is forced through feed ducts 55, 56 in an appropriate manner. Hot water is also supplied and removed through ducts 187, 197 of each of the four valve assemblies so as to maintain stuffing box 152 of each such assembly effective.

Also, during operation, heated lubricating oil internally heats the pistons to help keep effective the lubricant on the sliding surfaces of the pistons and cylinders and also to keep the piston rings 49 effective.

In the arrangement illustrated and so far described, it will be understood that the piston 34 is of the lubricated type such as would be the case if the wear bands 46, 48 and piston rings 49 were made of bearing bronze. However, it is within the purview of the inventive concept that the piston 34 may be of the non-lubricated type. With such an arrangement the lubrication ducts 55, 56 would not be used, and the wear bands 46, 48 and piston rings 49 would be made of a suitable self-lubricating material. An example of such a material is a long chain fluorinated polymer of ethylene filled with compounds such as carbon, molybdenum disulphide, bronze powder or chopped glass fiber. Such a polymer filled with bronze powder is preferred. With such an arrangement heat exchange fluids would still be circulated through the external cylinder jacket and through the piston internally in order to maintain the wear bands and piston rings in the desired operating temperature range of from about 32° F. to about 120° F. during which the filled polymer will exhibit its best self-lubricating properties.

From the foregoing, it will be seen that the present invention achieves the stated objects. The embodiment shown and described is intended to be illustrative and not limitative of the invention, the scope of which is to be measured by the appended claims.

What is claimed is:

1. In an expansion engine including a cylinder having a bore and a cylinder head having a recess alined with said bore, the combination therewith of an elongated piston reciprocably arranged in said bore and recess, a first annular wear band on said piston adjacent the end thereof remote from said head, a second and wider annular wear band arranged generally centrally on said piston so as to provide said piston with an end portion projecting axially toward said head, said second wear band never contacting said head during reciprocation of said piston, and sealing rings carried by said piston intermediate said wear bands.

2. In an expansion engine including a cylinder having a bore and a cylinder head having a recess alined with said bore, the combination therewith of an elongated hollow piston reciprocably arranged in said bore and recess, a first annular wear band on said piston adjacent the end thereof remote from said cylinder head, a second annular wear band arranged generally centrally on said piston so as to provide said piston with an axially projecting end portion, said second wear band never contacting said cylinder head during reciprocation of said piston, said piston having an internal annular groove adjacent said second wear band so as to provide a heat dam, and sealing rings carried by said piston intermediate said wear bands.

3. In an expansion engine including a cylinder having a bore and a cylinder head having a recess alined with said bore, the combination therewith of an elongated hollow piston reciprocably arranged in said bore and recess, a first annular wear band on said piston adjacent the end thereof remote from said cylinder head, a second annular wear band arranged generally centrally on said piston so as to provide said piston with an axially projecting end portion, said second wear band never contacting said cylinder head during reciprocation of said piston, means for circulating heating fluid internally through said piston adjacent said first wear band, and sealing rings carried by said piston intermediate said wear bands.

4. In an expansion engine including a cylinder having a bore and a cylinder head having a recess alined with said bore, the combination therewith of an elongated hollow piston reciprocably arranged in said bore and recess, a first annular wear band on said piston adjacent the end thereof remote from said cylinder head, a second annular wear band arranged generally centrally on said piston so as to provide said piston with an axially projecting end portion, said second wear band never contacting said cylinder head during reciprocation of said piston, said piston having an internal annular groove adjacent said second wear band so as to provide a heat dam, means for circulating heating fluid internally through said piston between said groove and first wear band, and sealing rings carried by said piston intermediate said wear bands.

5. In an expansion engine including a cylinder, the combination therewith of a piston reciprocably arranged in said cylinder, a reciprocable cross-head, a strut member operatively interposed between said piston and cross-head and having a universal connection with each, a crank operatively connected to said cross-head, annular chamber means in said piston, and passage means extending through said crank, cross-head and strut member for supplying heated lubricating oil to said chamber.

6. In an expansion engine including a cylinder, the combination therewith of an elongated cup-shaped piston reciprocably arranged in said cylinder and having a counterbored recess adjacent its open end, a reciprocable cross-head, a thrust block carrier arranged in said recess and having an external annular groove therein which groove jointly with the surrounding wall of said piston provides a chamber, a thrust block arranged on said carrier and having a partially spherical concave surface, a strut member operatively interposed between said piston and cross-head and having a partially spherical convex surface engaging said concave surface, means for retaining said surfaces in contact with each other, supply passageway means in said strut member, block and carrier and leading to said chamber for supplying heating fluid thereto, and return passageway means in said carrier, block and strut member for carrying fluid away from said chamber.

References Cited by the Examiner

UNITED STATES PATENTS

| | | | |
|---|---|---|---|
| 203,534 | 5/1878 | Collmann | 91—247 |
| 502,430 | 8/1893 | Danner et al. | 91—247 |
| 1,898,872 | 2/1933 | Evanoff et al. | 92—157 |
| 2,202,754 | 5/1940 | Caddy | 92—157 |
| 2,372,050 | 3/1945 | Frauenfelder et al. | 92—157 |
| 2,413,751 | 1/1947 | Dennis | 92—169 |
| 2,577,022 | 12/1951 | Lieberherr | 92—169 |
| 2,674,988 | 4/1954 | Evans et al. | 92—169 |
| 2,818,055 | 12/1957 | Hovde | 92—169 |
| 2,918,338 | 12/1959 | Grad | 92—157 |
| 2,926,975 | 3/1960 | Karde et al. | 92—157 |
| 3,155,015 | 11/1964 | Genz | 92—249 |

FOREIGN PATENTS 200,625  1/1956  Australia.

MARTIN P. SCHWADRON, *Primary Examiner.*

SAMUEL LEVINE, EDGAR W. GEOGHEGAN,
*Examiners.*

P. E. MASLOUSKY, *Assistant Examiner.*